United States Patent
Iwanir et al.

(10) Patent No.: US 10,558,458 B2
(45) Date of Patent: Feb. 11, 2020

(54) QUERY OPTIMIZER FOR CPU UTILIZATION AND CODE REFACTORING

(71) Applicant: Microsoft Technology Licensing, LLC, Redmond, WA (US)

(72) Inventors: Elad Iwanir, Tel Aviv (IL); Gal Tamir, Avichayil (IL); Amir Eluk, Ramat Gan (IL); Eli Koreh, Kfar Saba (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 152 days.

(21) Appl. No.: 15/174,688

(22) Filed: Jun. 6, 2016

(65) Prior Publication Data

US 2017/0351512 A1  Dec. 7, 2017

(51) Int. Cl.
  *G06F 8/72* (2018.01)
  *G06F 16/2453* (2019.01)

(52) U.S. Cl.
  CPC .......... *G06F 8/72* (2013.01); *G06F 16/24534* (2019.01)

(58) Field of Classification Search
  CPC .............................. G06F 17/30448; G06F 8/72
  USPC ......................................................... 717/110
  See application file for complete search history.

(56) References Cited

U.S. PATENT DOCUMENTS

| | | | |
|---|---|---|---|
| 7,747,606 B2 | 6/2010 | Dageville et al. | |
| 8,713,048 B2 | 4/2014 | Meijer et al. | |
| 8,914,782 B2 | 12/2014 | Isard et al. | |
| 9,177,017 B2 | 11/2015 | De Smet et al. | |
| 2004/0210882 A1 | 10/2004 | Takeuchi | |
| 2007/0038618 A1* | 2/2007 | Kosciusko | G06F 17/30306 |
| 2008/0065590 A1 | 3/2008 | Castro et al. | |
| 2009/0144229 A1 | 6/2009 | Meijer et al. | |
| 2011/0314000 A1* | 12/2011 | Chaudhuri | G06F 17/30463 707/718 |
| 2012/0078878 A1* | 3/2012 | De Smet | G06F 17/30457 707/713 |
| 2014/0082014 A1 | 3/2014 | Vanags et al. | |
| 2016/0098448 A1* | 4/2016 | McShane | G06F 17/2705 707/713 |

OTHER PUBLICATIONS

Murray et al., "Steno: Automatic Optimization of Declarative Queries", Jun. 4-8 2011, ACM 978-1-4503-0663—Aug. 11, 2006, 11 pages.*
"International Search Report and Written Opinion Issued in PCT Application No. PCT/US2017/035085", dated Jul. 27, 2017, 11 Pages.

(Continued)

*Primary Examiner* — Bing Zhao
*Assistant Examiner* — Hui-Wen Lin
(74) *Attorney, Agent, or Firm* — Fiala & Weaver P.L.L.C.

(57) ABSTRACT

Methods, systems, apparatuses, and computer program products are provided for increasing an efficiency of queries in program code. A plurality of queries is detected in program code. A laziness is extended by which the queries are evaluated in the program code. The queries are decomposed into a plurality of query components. A ruleset that includes a plurality of rules is applied to the query components to generate a functionally equivalent query set to the plurality of queries that evaluates more efficiently relative to the plurality of queries.

20 Claims, 6 Drawing Sheets

(56) References Cited

OTHER PUBLICATIONS

Murray, et al., "Steno: Automatic Optimization of Declarative Queries", In Proceedings of the 32nd ACM SIGPLAN Conference on Programming Language Design and Implementation, Jun. 4, 2011, 11 pages.

Malecha, et al., "Using Dependent Types and Tactics to Enable Semantic Optimization of Language-Integrated Queries", In Proceedings of the 15th Symposium on Database Programming Languages, Oct. 27, 2015, pp. 1-10.

"Office Action Issued in Indonesian Patent Application No. P00201809953", dated Sep. 25, 2019, 3 Pages.

* cited by examiner

QUERY OPTIMIZER FOR CPU UTILIZATION AND CODE REFACTORING

BACKGROUND

Various types of software development applications exist that software developers may use to develop software. An integrated development environment (IDE) is a type of software development application that contains several development tools in one package. An IDE may include tools such as a source code editor ("code editor"), a build automation tool, and a debugger. Examples of IDEs include Eclipse™ developed by Eclipse Foundation of Ottawa, Canada, ActiveState Komodo™ developed by ActiveState of Vancouver, Canada, IntelliJ IDEA developed by JetBrains of the Czech Republic, Oracle JDeveloper™ developed by Oracle Corporation of Redwood City, Calif., NetBeans developed by Oracle Corporation, Codenvy™ developed by Codenvy of San Francisco, Calif., Xcode® developed by Apple Corporation of Cupertino, Calif., and Microsoft® Visual Studio®, developed by Microsoft Corporation of Redmond, Wash.

Many modern programming languages natively support queries for data. For example, the Microsoft .NET Framework, developed by Microsoft Corporation, supports queries in the form of LINQ (Language Integrated Query), while Java®, developed by Oracle Corporation or Redwood City, Calif., supports queries in the form of Streams. Native support of queries in a programming language enables developers to concentrate on the logic part of their program code, because the integrated query functionality takes care of the actual implementation of the queries for them. This can allow a developer to speed up their coding.

However, not knowing or having a poor understanding of the consequences of inefficient queries can lead to inefficient program code being developed. Furthermore, due to today's best practices for developing software, developers tend to split larger methods/procedures into smaller methods/procedures in their code for greater readability, which can also lead to inefficiencies in queries in program code.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are provided for increasing an efficiency of queries in program code. A plurality of queries is detected in program code, such as when the program code is entered in a code editor or during compile time. A laziness is extended by which the queries are evaluated in the program code. Furthermore, a ruleset that includes a plurality of rules is applied to the detected queries to generate a functionally equivalent query set that evaluates more efficiently relative to the detected queries.

The rules included in the ruleset can be generated in any manner, including being generated manually by a user or automatically-generated by an algorithm, such as machine learning, big data analysis of code examples, etc. A set of such rules can significantly improve most common errors that occur in developers daily work.

Either a single functionally equivalent query set may be generated and input into the program code in place of one or more of the existing queries, or multiple candidate functionally equivalent query sets can be generated, from which one query set is selected to be input into the program code. A user may select the candidate functionally equivalent query set to be input into the program code, or the candidate functionally equivalent query set may be selected automatically. The selection of the candidate functionally equivalent query set may be influenced by whether the selection is made during development (e.g., during code entry or at compilation time), or is made during runtime. During runtime, a candidate functionally equivalent query set may be selected from the multiple candidates for input into the program code based (at least in part) on runtime factors (e.g., execution conditions such as network availability, processing power available, etc.).

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
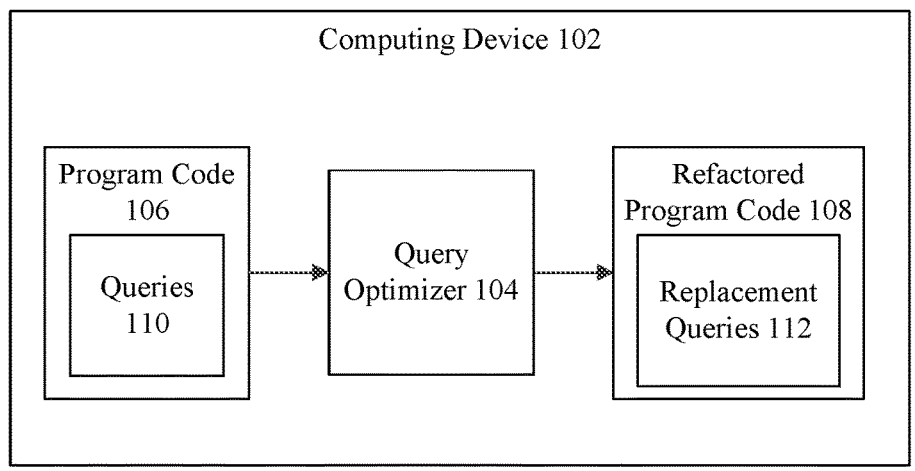
FIG. 1 shows a block diagram of a computing device that contains a query optimizer configured to improve an efficiency of query execution in program code, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments for Optimizing Queries in Program Code

Many modern programming languages natively support queries. For example, the Microsoft .NET Framework, developed by Microsoft Corporation, supports queries in the form of LINQ (Language Integrated Query), while Java®, developed by Oracle Corporation or Redwood City, Calif., supports queries in the form of Streams. Native support of queries in a programming language enables developers to concentrate on the logic part of their program code by taking care of the actual implementation of the queries for them. This can allow a developer to speed up their coding. However, not knowing or having a poor understanding of the consequences of inefficient queries can lead to poorly functioning program code being developed. For example, such program code may include queries that retrieve data that ends up being unused, that retrieves redundant quantities of data, and/or that retrieves data more often or earlier than necessary. Queries can be written in many different ways that yield the same logical results, but have very different impact on performance.

Furthermore, due to today's best practices for developing software, developers tend to split larger methods/procedures into smaller methods/procedures in their code for greater readability. Currently available code optimizers can have difficulty in optimizing code that has been developed this way.

According to embodiments, program code is automatically analyzed for queries that are inefficiently implemented, and the queries are replaced with a set of more efficient but logically equivalent queries. Such embodiments may be implemented to take affect during compilation time (e.g., for CPU optimization) and/or to be implemented as refactoring suggestions in IDE tools and/or IDE add-ins. For example, in an embodiment, a code editor is configured to determine a more efficient query set and to suggest the more efficient query set to a developer to be implemented in the developer's code. Embodiments enable readable code to be developed by developers, then transform the code into more efficient code automatically.

In an embodiment, a query optimizer may be configured to: (a) identify queries (e.g., LINQ, Streams, etc.) in program code, (b) inspect the queries' results to determine their usage/context, (c) decompose the queries into atomic units, (d), aggregate (a), (b), and (c) to determine where query optimizations can be implemented. For example, pattern matching may be performed against a set of rules, which can be either explicitly defined rules and/or automatically-generated rules. For example, rules can be automatically-generated by an algorithm, such as machine learning, big data analysis of code examples, etc. A set of such rules can significantly improve most common errors that occur in developers daily work.

Accordingly, embodiments provide one or more of: (1) a tool and process that analyze and recommend code changes that improve query performance, (2) a tool and process that automatically change queries into equivalent more optimized queries, (3) a pre-processing code analyzing tool and process for compilers for automatic performance improvements for queries, (4) an automatic tool and process that analyze and recommend code refactoring regarding queries for databases (like "entity framework" in .NET and equivalents in other languages), and a code optimization tool and process that implement machine learning, which samples equivalent queries during run time and automatically chooses and replaces the best query for the scenario.

As used herein, a query is a query (or request) for data, and may also be referred to as a data query. A query may be provided to any source of data, including a database, an application, an API (application programming interface), etc. A query to a database may be referred to as a "database query."

Embodiments may be implemented in various ways. For instance, FIG. 1 shows a block diagram of a computing device 102 that contains a query optimizer 104 configured to improve an efficiency of query execution in program code, according to an example embodiment. As shown in FIG. 1, query optimizer 104 receives program code 106 entered by a developer (a person who writes/inputs/modifies program code). Program code 106 includes a plurality of queries 110. Queries 110 includes multiple queries, which may include one or more separate query operators and/or one or more query expressions (strings/series of query operators). Query optimizer 104 is configured to analyze and generate a replacement set of queries for queries 110, thereby outputting refactored program code 108 that includes replacement queries 112. Refactored program code 108 is program code that is logically equivalent (performs the same function(s)) as original program code 106, but is rewritten with replacement queries 112. Replacement queries 112 are configured to perform more efficiently than original queries 110, such as by avoiding retrieving data not used by the program code, avoiding making redundant data retrieval requests, avoiding performing redundant operations, and/or retrieving data less frequently and/or later (increasing laziness).

Figure 2:
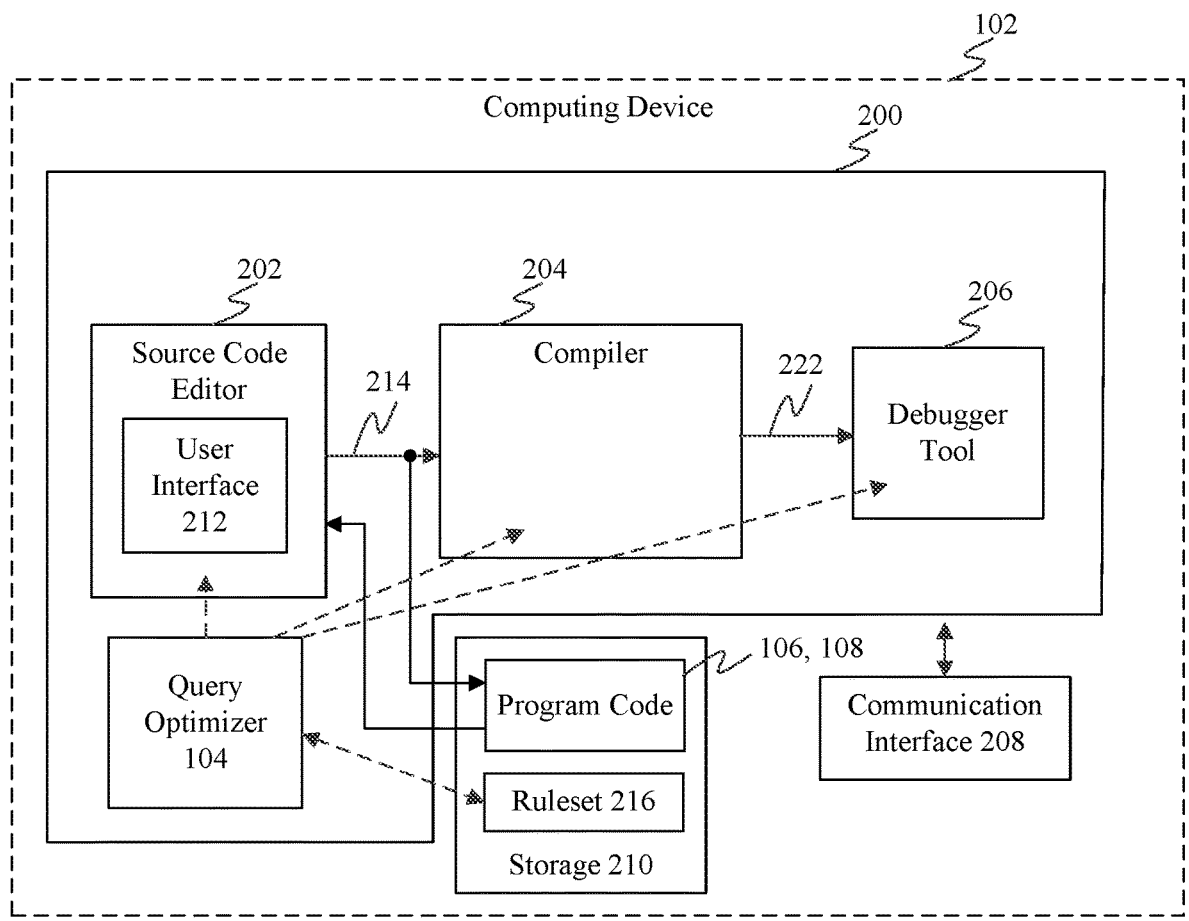
FIG. 2 shows a block diagram of a computing device that includes a development application having a query optimizer configured to improve an efficiency of query execution in program code, according to an example embodiment.

Query optimizer 104 may be implemented independently or included in any system or tool that may be used by a developer to input or process program code, such as a code editor, a code compiler, a code debugger, etc. For instance, FIG. 2 shows a block diagram of computing device 102 including a development application 200 that includes query optimizer 104, according to an example embodiment. Development application 200 is an example of an integrated development environment (IDE). As shown in FIG. 2, computing device 102 including development application 200, storage 210, and a communication interface 208. Storage 210 stores program code 106 and 108 and ruleset 216. Development application 200 includes a source code editor 202, a compiler 204, and a debugger tool 206. Source code editor 202 includes a user interface 212. As indicated by dotted arrows, query optimizer 104 may be implemented in or called by any one or more of source code editor 202, complier 204, and/or debugger tool 206. Note that development application 200 is shown for illustrative purposes, and as an example embodiment, and not all features of development application 200 need to be present in all embodiments. Furthermore, additional features not shown in FIG. 2 may be present in some embodiments. The features of development application 200 shown in FIG. 2 are described as follows.

As shown in FIG. 2, development application 200 may be implemented in one or more computing devices 102. For instance, source code editor 202, compiler 204, and debugger tool 206 may be included in a same computing device, or one or more of source code editor 202, compiler 204, and debugger tool 206 may be implemented in one or more computing devices separate from those of others of source code editor 202, compiler 204, and debugger tool 206.

Computing device 102 may be one or more of any type of stationary or mobile computing device(s), including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer).

Code editor 202 may be any proprietary or conventional code editor configured for editing of program code mentioned elsewhere herein or otherwise known (e.g., a code editor of Eclipse™, ActiveState Komodo™, IntelliJ IDEA, Oracle JDeveloper™ NetBeans, Codenvy™, Xcode®, Microsoft® Visual Studio®, etc.).

A developer may interact with source code editor 202 to enter and modify program code when generating source code for an application. For instance, the developer may interact with a user interface 212 of source code editor 202 to add, modify, or delete program code text such as by typing, by voice input, by selecting suggested code blocks, etc. Accordingly, user interface 212 may include one or more text entry boxes/windows (e.g., code editor window 604 of FIG. 6), voice/speech recognition, one or more graphical user interface elements (e.g., buttons, check boxes, radio buttons, pull down menus, etc.), and/or other user interface elements that a developer may interact with. When complete, or at other intervals, the user may be enabled to save the program code by interacting with a "save" button or other user interface element.

For instance, as shown in FIG. 2, a developer may interact with user interface 212 of source code editor 202 to generate program code 106. Program code 106 is source code, which is a collection of computer instructions (possibly with comments) written using a human-readable computer programming language. Examples of suitable human-readable computer programming languages include C#, C++, Java, etc. Program code 106 may be received in one or more files or other form. For instance, program code 106 may be received as one or more ".c" files (when the C programming language is used), as one or more ".cpp" files (when the C++ programming language is used), etc. When query optimizer 104 is used by source code editor 202 to refactor program code 106, refactored program code 108 may be generated and saved by source code editor 202. In embodiments, source code editor 202 may apply rules of ruleset 216 to query components (also referred to as "query operators") of program code 106 to create a more efficient set of queries in refactored program code 108.

As shown in FIG. 2, program code 106 and/or 108 may be stored in storage 210. Storage 210 may include one or more of any type of physical storage hardware/circuitry to store data, including a magnetic disc (e.g., in a hard disk drive), an optical disc (e.g., in an optical disk drive), a magnetic tape (e.g., in a tape drive), a memory device such as a RAM device, a ROM device, etc., and/or any other suitable type of physical storage hardware/circuitry.

Compiler 204 may be invoked in any manner, such as by a command line, a graphical user interface, etc. A "-full" switch, or other switch, may be used when compiler 204 is invoked to perform a full compile. Compiler 204 is configured to receive and compile program code 106 (or program code 108) to generate machine code 222. In particular, compiler 204 is configured to transform program code 106 and/or 108 into machine code 222 in the form of another computer language, typically having a binary form, referred to as machine code or object code. In some cases, compiler 204 may include multiple stages, and may first convert program code 106 into an intermediate form (e.g., an intermediate language), which is subsequently converted into machine code 222.

Compiler 204 may be configured to perform one or more types of optimizations on program code 106 and/or 108 when generating machine code 222. An optimized build results in machine code that is semantically equivalent to machine code generated without optimizations, but is configured in a way that fewer resources are used during execution of the optimized machine code (e.g., less memory, fewer procedure calls, etc.). Examples of optimizations that may be performed include loop optimizations, data-flow optimizations, SSA-based optimizations, code-generator optimizations, functional language optimizations, interprocedural optimizations, and/or further types of optimizations that would be known to persons skilled in the relevant art(s).

Many specific types of optimizations exist. For example, "inlining" may be performed, where a callee function called by a caller function is copied into the body of the caller function. In another example of a specific optimization, "common subexpression elimination" may be performed, where a single instance of code is used for a quantity that is computed multiple times in source code. When query optimizer 104 is used by compiler 204 to refactor program code 106, refactored program code 108 may be generated and used to generate machine code 222 by compiler 204.

Machine code 222 may be included in a file (e.g., an object or ".obj" file), or may be created/stored in another form, to form an executable program or application. Machine code 222 may optionally be stored in storage 210.

When program code 106 and/or 108 is compiled by compiler 204 for the debug stage of development, debugger tool 206 may receive machine code 222. Debugger tool 206 is configured to run a debugger (or "debug", "debugging") session on the application represented by machine code 222. In a debugger session, a developer may be enabled to step through the execution of code of machine code 222, while viewing the values of variables, arrays, attributes, and/or outputs (e.g., contents of registers, a GUI, etc.) generated by the execution of machine code 222, including having access to the effects of any debug code/statements entered into program code 106 and/or 108 (and passed to machine code 222 by compiler 204 for purposes of debug). In this manner, a developer may be able to test or troubleshoot ("debug") program code 106 and/or 108, making edits to program code 106 and/or 108 using source code editor 202 based on the results of the debugger session. The modified version of program code 106 and/or 108 may be compiled by compiler 204 and received by debugger tool 206 for further debugging. During debug, debugger tool 206 may suggest and/or rewrite queries in program code 106 to generate program code 108. Debugger tool 206 may include one or more processors (e.g., a central processing unit (CPU)), physical and/or virtual, that execute(s) machine code 222.

When debugging by debugger tool 206 is complete, and program code 106 and/or 108 is in its final version, compiler 204 may compile program code 106 and/or 108 to generate machine code 222 for the release stage of development. The release version of machine code 222 may be released to be used by users.

Communication interface 208 is configured to transmit program code 106 and/or 108 to remote entities, to receive rules for improving program code in accordance with embodiments, and/or to communicate other data according to any suitable communication protocol, proprietary or conventional. Further examples of communication interfaces and communication protocols are described in the next section.

Figure 3:
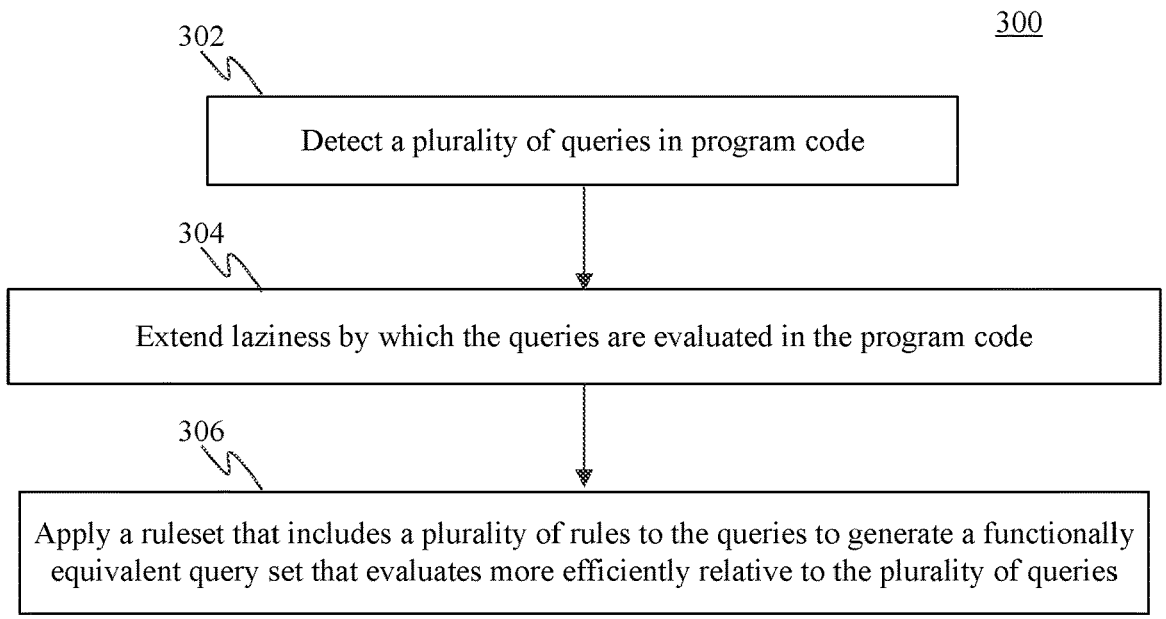
FIG. 3 shows a flowchart providing a process for improving an efficiency of query execution in program code, according to an example embodiment.
Figure 4:
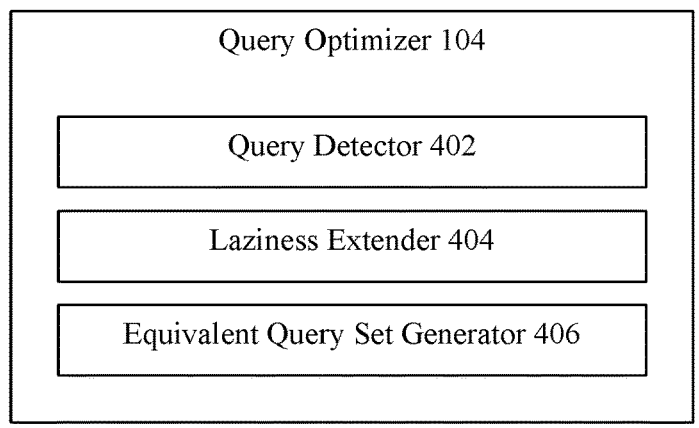
FIG. 4 shows a block diagram of a query optimizer, according to an example embodiment.

Query optimizer 104 may be configured in various ways to perform its functions. For instance, FIG. 3 shows a flowchart 300 providing a process for improving an efficiency of query execution in program code, according to an example embodiment. Query optimizer 104 may operate according to flowchart 300 in an embodiment. Flowchart 300 is described as follows with reference to FIG. 1 and FIG. 4. FIG. 4 shows a block diagram of query optimizer 104, according to an example embodiment. As shown in FIG. 4, query optimizer 104 includes a query detector 402, a laziness extender 404, and an equivalent query set generator 406, which are described as follows with reference to flowchart 300.

Flowchart 300 begins with step 302. In step 302, a plurality of queries is detected in program code. As shown in FIG. 1, query optimizer 104 receives program code 106, which includes queries 110. Query detector 402 of FIG. 4 is configured to parse through program code 106 to detect queries. Query detector 402 may detect queries in any manner, such as by comparing code terms in program code 106 to a predetermined list of known query operators/components, etc. For instance, when searching for LINQ queries, query detector 402 may parse through program code 106 for known LINQ operators such as Select, Where, Sum, Min, Max, Average, Aggregate, Join, GroupJoin, OrderBy, GroupBy, Union, Contains, Count, ToList, ToDictionary, etc. Each found query operator (e.g., found by text matching) is indicated by query detector 402 as a query for program code 106.

In one illustrative example, query detector 402 may parse the following program code for queries:

```
public void Main( )
    var 1stOfPrimes = ReturnListOfPrimes(1000);
    var 1stOrdered = 1stOfPrimes.OrderBy(x => x).ToList( );
    var 1stOrderedDesc = 1stOrdered.OrderByDescending(x => x).ToList( );
    Console.WriteLine("Biggest prime in range is: {0}",
1stOrderedDesc.First( ));
```

In this example, query detector 402 may detect the LINQ queries of Orderby(x=>x) and ToList( ) in the third line of code, and the LINQ queries of OrderByDescending(x=>x) and ToList( ) in the fourth line of code.

Figure 5:
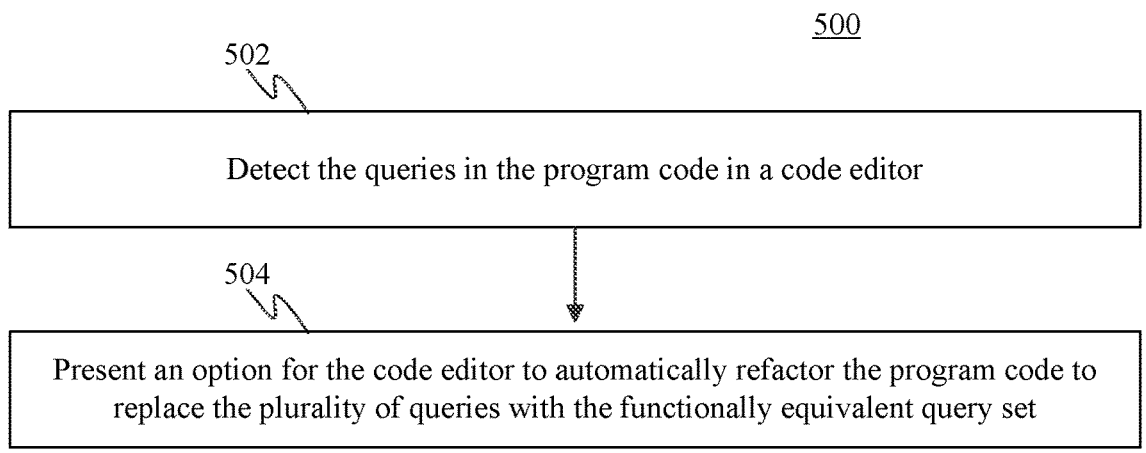
FIG. 5 shows a flowchart providing a process for generating and presenting a suggested replacement query set in a code editor, according to an example embodiment.

Note that step 302 (and the rest of flowchart 300) may be implemented by query optimizer 104 in any suitable code development tool or application. For example, FIG. 5 shows a flowchart 500 providing a process for generating and presenting a suggested replacement query set in a code editor, according to an example embodiment. In an embodiment, flowchart 300 of FIG. 3 may implement flowchart 500 of FIG. 5. For instance, step 302 of flowchart 300 may implement step 502 of flowchart 500, and step 504 may be an additional step to flowchart 300. Flowchart 500 is described as follows.

In step 502, the queries are detected in the program code in a code editor. In an embodiment, query detector 402 may be configured to detect queries in program code 106 in a code editor, such as code editor 202 (FIG. 2), where a developer enters and edits program code. Query detector 402 may perform a query term search in program code 106 as the developer enters code, whenever the developer saves the code, in response to request by the developer (e.g., by clicking on a "query detect" button), on a periodic basis, and/or at any other desired time or basis.

Figure 6:
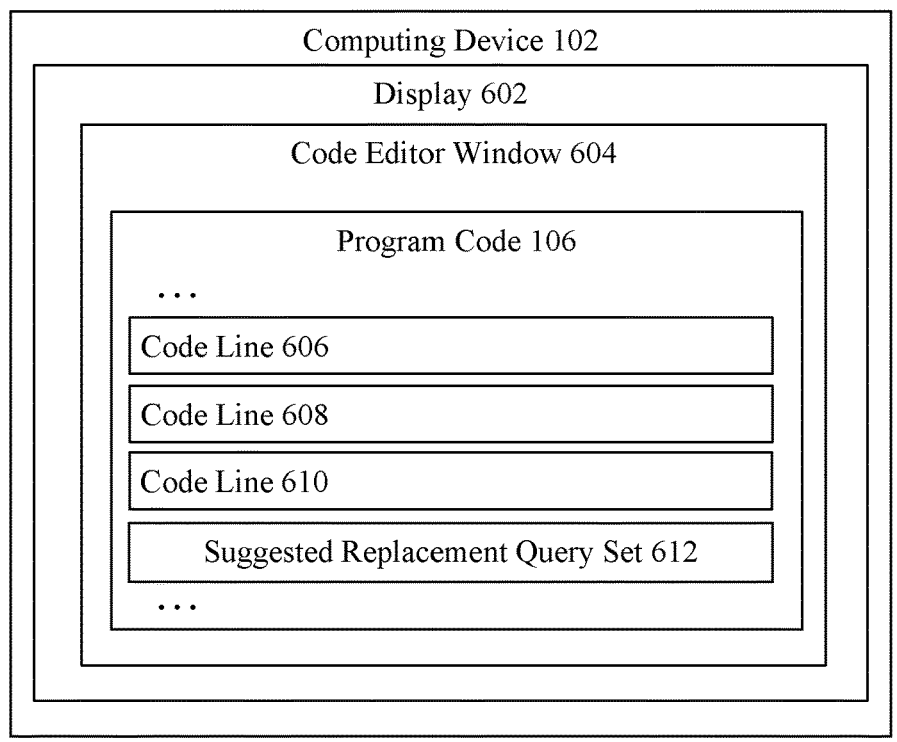
FIG. 6 shows a block diagram of a computing device that includes a code editor window displaying program code with a suggested replacement query set, according to an example embodiment.

For instance, FIG. 6 shows a block diagram of computing device 102 including a code editor window 604 displaying program code 106, according to an example embodiment. Display 602 may be any suitable type of display device or screen, including an LCD (liquid crystal display), a CRT (cathode ray tube) display, an LED (light emitting diode) display, a plasma display, etc. Code editor window 604 is a window (framed or frameless) displayed by code editor 202 in display 602 as a graphical user interface (GUI) for interaction with program code 106 displayed in code editor window 604. Code lines 606, 608, and 610 are each one or more lines of code of any suitable programming language, as would be known to persons skilled in the relevant art(s). In an embodiment, query detector 402 parses program code 106, including code lines 606, 608, and 610, for queries according to step 502.

In step 504, an option is presented for the code editor to automatically refactor the program code to replace the plurality of queries with the functionally equivalent query set. In an embodiment, after query optimizer 104 detects queries and determines more efficient queries to replace the detected queries in program code 106 (as further described elsewhere herein), code editor 202 may present an option for the developer to accept or reject the determined more efficient queries. For instance, as shown in FIG. 6, a suggested replacement query set 612 may be displayed in code editor window 604 for acceptance or rejection by the developer. Suggested replacement query set 612 is a suggested set of queries determined by query optimizer 104 to be more efficient than the set of queries detected in program code 106. If the developer accepts suggested replacement query set 612 (e.g., by clicking on a button), code editor 202 may replace the detected set of queries with suggested replacement query set 612 in program code 106 to generate and display refactored program code 108 in code editor window 604. If the developer rejects suggested replacement query set 612, no change is made to program code 106, and the suggestion is no longer displayed. Note that in another embodiment, suggested replacement query set 612 may be automatically implemented in program code 106 (without requesting developer acceptance).

Figure 7:
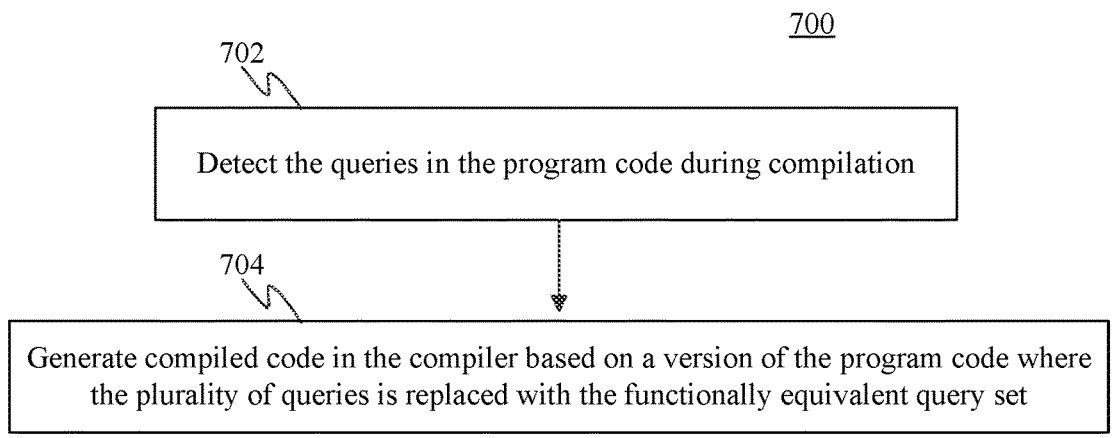
FIG. 7 shows a flowchart providing a process for generating and implementing a replacement query set at compile time, according to an example embodiment.

In another embodiment, as described above, query detector 402 may be configured to detect queries in program code 106 during compilation. For instance, FIG. 7 shows a flowchart 700 providing a process for generating and implementing replacement query set at compile time, according to an example embodiment. In an embodiment, flowchart 300 of FIG. 3 may implement flowchart 700 of FIG. 7. For instance, step 302 of flowchart 300 may implement step 702 of flowchart 700, and step 704 may be an additional step to flowchart 300. Flowchart 700 is described as follows.

In step 702, the queries are detected in the program code during compilation. In an embodiment, query detector 402 may be configured to detect queries in program code 106 (e.g., by text matching, etc.) in a compiler, such as compiler 204 (FIG. 2), when program code 106 is compiled.

In step 704, compiled code is generated in the compiler based on a version of the program code where the plurality of queries is replaced with the functionally equivalent query set. In an embodiment, as described in further detail below, query optimizer 104 is configured to generate a more efficient replacement query set for the queries detected in program code 106 by query detector 402, to replace the detected queries with the replacement query set in a copy of program code 106 to generate refactored program code 108, and to generate a compiled version of program code 106 by compiling refactored program code 108. In this manner, compiled machine code is generated that includes the more efficiently operating query set without changing program code 106, such that the developer does not see changed queries when subsequently editing program code 106 in code editor 202. In another embodiment, however, the replacement query set may be automatically implemented in program code 106 at compile time (without requesting developer acceptance).

Referring back to flowchart 300 of FIG. 3, in step 304, laziness is extended by which the queries are evaluated in the program code. In an embodiment, laziness extender 404 is configured to analyze the queries detected in program code 106 by query detector 402, and to extend a laziness of the evaluation of the queries (when the program code is executed). "Lazy evaluation" refers to an evaluation technique that delays the evaluation of an expression until its value is needed. Laziness extender 404 is configured to receive a query and postpone execution of as much of its operators as late as possible. Accordingly, laziness extender 404 analyzes program code 106 to determine queries that can have their evaluation delayed, and determines an equivalent one or more query statements that perform the queries in a delayed fashion.

Figure 8:
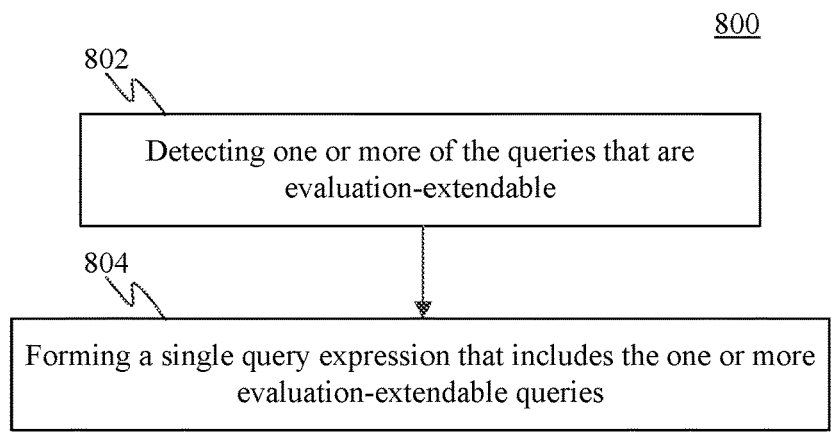
FIG. 8 shows a flowchart providing a process for extending the laziness of query execution in program code, according to an example embodiment.
Figure 9:
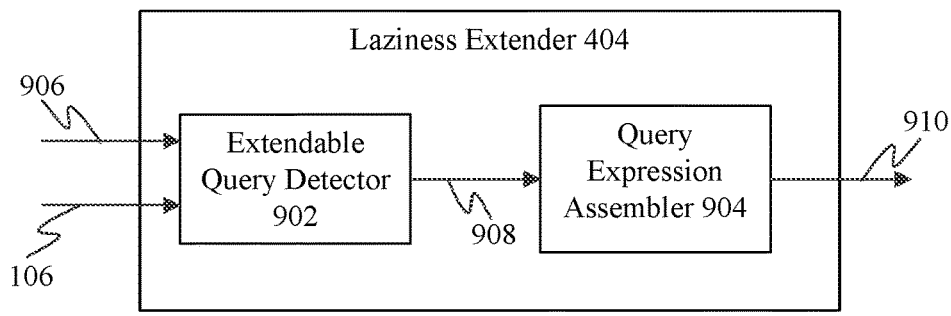
FIG. 9 shows a block diagram of a laziness extender, according to an example embodiment.

For example, FIG. 8 shows a flowchart 800 providing a process for extending the laziness of query execution in program code, according to an example embodiment. In an embodiment, laziness extender 404 operates according to flowchart 800. Flowchart 800 is described as follows with respect to FIG. 9. FIG. 9 shows a block diagram of laziness extender 404, according to an example embodiment. As shown in FIG. 9, laziness extender 404 includes an extendable query detector 902 and a query expression assembler 904.

Flowchart 800 begins with step 802. In step 802, one or more of the queries that are evaluation-extendable are detected. In an embodiment, extendable query detector 902 of laziness extender 404 analyzes program code 106 to determine queries that can have their evaluation delayed because their output values are not needed at their present location in program code 106, but instead are used later. In such an embodiment, extendable query detector 902 is configured, for a particular query, to parse past the query in program code 106 to find a location (e.g., an expression, a code line, etc.) at or closer to where the value of the query is needed, such as where the value is directly output to a user or where an expression uses the value to generate an output to the user.

In an embodiment, extendable query detector 902 begins by building a data structure such as an Operation Tree for each query of detected queries 906, which includes the queries detected by query detector 402 in the program code as well as non-query program code operations. Extendable query detector 902 lists multiple related queries together under the same Operation Tree. Such an Operation Tree may be represented as a graph, where each node represents a matching query operator of the query that does not fetch actual data from the data source (e.g., performs an operation on data), and each leaf of the Operation Tree represents a query operator of the query that fetches actual data from the data source. Extendable query detector 902 builds the Operation Tree by following each variable/query operator/method/code statement in the program code and recursively adding the data to the Operation Tree. Accordingly, extendable query detector 902 receives queries and transforms them to the relevant tree.

For instance, in one example, extendable query detector 902 may analyze the following program code to determine one or more LINQ queries that can have their evaluation delayed:

var 1stOfPrimes=ReturnListOfPrimes(1000);
    var 1stOrdered=1stOfPrimes.OrderBy(x=>x).ToList( );
    Console.WriteLine("Smallest prime in range is: {0}", 1stOrdered.First( ));

This example program code includes the detected LINQ queries of OrderBy, ToList, and First. Extendable query detector 902 designates the following Operation Tree:

1stOfPrimes—ReturnListOfPrimes—OrderBy—ToList—First where 1stOfPrimes is the highest level element of the Operation Tree, and First is the lowest level element of the Operation Tree. In this example, extendable query detector 902 indicates OrderBy and ToList as extendable (delayed execution) because the value of 1stOrdered is not immediately needed (is an input to the subsequent code line), but First is a leaf, and thus is not indicated as extendable.

In another example, extendable query detector 902 may analyze the following program code to determine one or more LINQ queries that can have their evaluation delayed:

var 1stOfPrimes=ReturnListOfPrimes(1000);
    var 1stOrdered=1stOfPrimes.OrderBy(x=>x).ToList( );
    var LastOrdered=1stOfPrimes.OrderByDescending (x=>x).ToList( );
    Console.WriteLine("Smallest prime in range is: {0}", 1stOrdered.First( );
    Console.WriteLine("Biggest prime in range is: {0}", LastOrdered.First( );

This example program code includes the detected LINQ queries of OrderBy, ToList, OrderByDescending, ToList, First, and First. Extendable query detector 902 designates an Operation Tree having the following first and second branches:

1 stOfPrimes—ReturnListOfPrimes—OrderBy—ToList—First
and
1stOfPrimes—ReturnListOfPrimes—OrderByDescending—ToList—First In this Operation Tree, a common 1stOfPrimes element is the highest level element, and the OrderBy and OrderByDescending nodes branch from a common ReturnListOfPrimes node linked to the 1stOfPrimes element. In this example, extendable query detector 902 indicates OrderBy and ToList in the first branch and OrderByDescending and ToList in the second branch as extendable (delayed execution) because the values of 1stOrdered and LastOrdered are not immediately needed (are inputs to subsequent code line), but the First in the first branch and the First in the second branch are both leafs, and thus are not indicated as extendable.

In still another example, extendable query detector 902 may analyze the following example program code to determine one or more LINQ queries that can have their evaluation delayed. This example program code is designed to find the last prime number in the range of 2 to 1000:

```
public List<int> ReturnListOfPrimes(int range)
{
    return Enumerable.Range(2, range).Where(IsPrime).ToList( );
}
```

```
public Dictionary<int, double. ReturnDictionaryOfPower(List<int> 1stOfInts, int pow)
{
    return 1stOfInts.ToDictionary(x => x, x => Math.Pow(x, pow));
}
public void MainMethod( )
{
    var 1stOfPrimes = ReturnListOfPrimes(1000);
    var power = ReturnDictionaryOfPower(1stOfPrimes, 2);
    var lastItem = power.Last( );
    Console.WriteLine("Last prime: {0}, {1}", lastItem,Key,
       lastItem.Value);
}
```

In this example, the third method ("MainMethod") references two earlier methods ("ReturnListOfPrimes" and "ReturnDictionaryOfPower"). The first method includes query components of Range, Where, and ToList. The second method includes the ToDictionary query component. The third method includes the Last query component. Query detector 402 detects these queries in the three methods (step 302 of FIG. 3). As shown in FIG. 9, extendable query detector 902 receives detected queries 906, which includes the queries detected by query detector 402 in the program code. In an embodiment, extendable query detector 902 analyzes detected queries 906 and program code 106 (e.g., by generating an Operation Tree, not shown here for purposes of brevity) to determine whether the detected queries can be lazily evaluated in program code 106.

In particular, the third method includes four code lines. When the third method is executed, the first line accesses the first method for a first value, the second line accesses the second method for a second value (based on the first value), the third line performs a query (Last) related to the second value to generate a third value, and the fourth line generates an output based on the third value. Accordingly, extendable query detector 902 determines that the first and second lines generate values that are not immediately needed (e.g., not output to the user or to the database), but instead are used as inputs to subsequent code lines, and thus the evaluation of the queries in the first and second lines can be delayed. As shown in FIG. 9, extendable query detector 902 outputs extendable queries 908, which indicates the queries determined by extendable query detector 902 as being extendable.

Referring back to flowchart 800 in FIG. 8, in step 804, a single query expression is formed that includes the one or more evaluation-extendable queries. In an embodiment, query expression assembler 904 receives extendable queries 908, and generates a single query expression that includes the queries determined to be evaluation-extendable (in step 802). As shown in FIG. 9, query expression assembler 904 generates modified queries 910, which includes the single query expression that combines evaluation-extendable queries determined by extendable query detector 902 for program code. Note that for particular program code, query expression assembler 904 may generate one or more of such query expressions that combine evaluation-extendable queries. Techniques performed by query expression assembler 904 to combine separate queries into a single query expression will be known to persons skilled in the relevant art(s), and will depend on the particular query language. In one example, a variable in an expression may be replaced with an expression used elsewhere to determine the variable.

For instance, with respect to the above example program code, query expression assembler 904 may generate the following single query expression for the "var lastItem" expression, which includes the LINQ queries of the first and second methods and the first three lines of the third method:

```
Public void MainMethod( )
{
    var lastItem = Enumerable.Range(2, 1000).
       Where(IsPrime).ToList( ).ToDiction
    ary(x => x, x => Math.Pow(x, pow)).Last( );
    Console.WriteLine("Last prime: {0},{1}", lastItem.Key, lastItem.Value);
}
```

As shown above, the "var lastItem" expression is an aggregated set of query components that includes the Range, Where, ToList, ToDictionary, and Last query components of all three methods, and is functionally-equivalent to the original program code shown further above. In this manner, the Range, Where, ToList, ToDictionary, and Last query components are lazily evaluated when the "MainMethod" is executed, only being evaluated immediately prior to the "lastItem" output being presented.

Note that in an embodiment, query expression assembler 904 may operate by receiving the Operation Tree generated by extendable query detector 902 for a query, and in the Operation Tree data structure, indicate/mark query operators that explicitly cause query execution to be "disabled" if not a leaf. In other words, query expression assembler 904 may mark the Operation Tree in such a manner that query execution happens only on leafs, thereby extending the laziness of the query to a latest point in time.

Referring back to flowchart 300 in FIG. 3, in step 306, a ruleset that includes a plurality of rules is applied to the query components to generate a functionally equivalent query set to the plurality of queries that evaluates more efficiently relative to the plurality of queries. In an embodiment, equivalent query set generator 406 (FIG. 4) is configured to analyze the detected queries (queries 110 of FIG. 1) and generate an alternative query set (replacement queries 112 of FIG. 1) that is functionally equivalent to the detected queries, yet executes more efficiently than the original configuration of the detected queries. For instance, equivalent query set generator 406 may generate replacement queries 112 to avoid retrieving data that is not used by the program code, to avoid making redundant retrievals of data, to avoid performing operations on data that have no effect on output, etc. To enact these efficiencies, equivalent query set generator 406 may remove query components, add query components, and/or modify query components.

Figure 10:
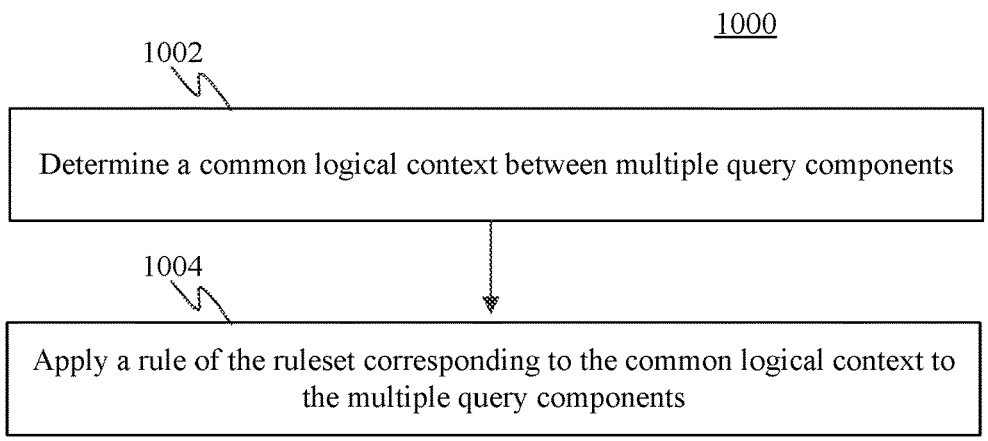
FIG. 10 shows a flowchart providing a process for applying a ruleset to determine a replacement query set for program code, according to an example embodiment.
Figure 11:
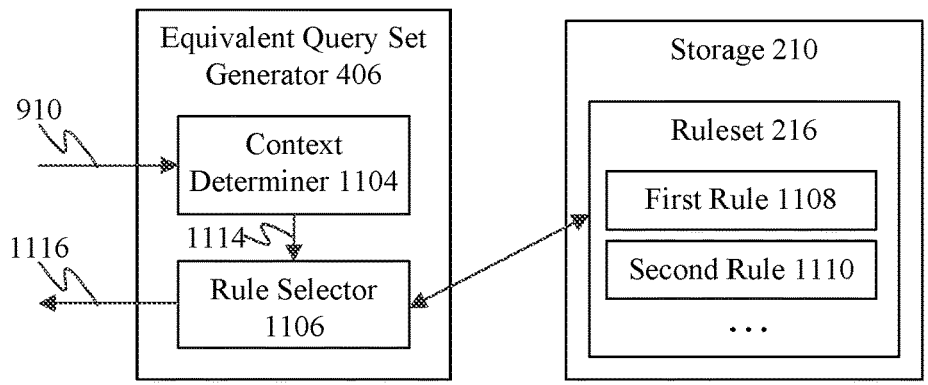
FIG. 11 shows a block diagram of an equivalent query set generator, according to an example embodiment.

Equivalent query set generator 406 may perform its functions in various ways. For instance, FIG. 10 shows a flowchart 1000 providing a process for applying a ruleset to determine a replacement query set for program code, according to an example embodiment. Equivalent query set generator 406 may operate according to flowchart 1000 in an embodiment. Flowchart 1000 is described as follows with respect to FIG. 11. FIG. 11 shows a block diagram of equivalent query set generator 406, according to an example embodiment. As shown in FIG. 11, equivalent query set generator 406 includes a context determiner 1104 and a rule selector 1106, and is communicatively coupled with storage 210 containing ruleset 216.

Flowchart 1000 begins with step 1002. In step 1002, a common logical context between multiple query components is determined. As shown in FIG. 11, context determiner 1104 receives modified queries 910, which are the queries detected by query detector 402 and rewritten for lazier evaluation by laziness extender 404. Context determiner 1104 analyzes modified queries 910 for a common logical context. For example, context determiner 1104 may decompose modified queries 910, which may be a single query expression, into a set of query components, and compares the query components to each other. When similar or related types of query components are detected (e.g., OrderBy and OrderByDescending, etc.), a common logical context between the query components is established. As shown in FIG. 11, context determiner 1104 outputs contextually associated queries 1114, which includes groups of query components of modified queries 910 that are contextually associated.

In step 1004, a rule of the ruleset corresponding to the common logical context is applied to the multiple query components. As shown in FIG. 11, rule selector 1106 receives contextually associated queries 1114. Rule selector 1106 analyzes contextually associated queries 1114 for applicability of rules of ruleset 216, such as a first rule 1108, a second rule 1110, etc. Each rule of ruleset 216 is configured to be applied to query components of a corresponding common context, and to rewrite the query components for greater efficiency, such as by adding, modifying, and/or deleting query components of the contextually associated queries. Any number and variety of rules may be included in ruleset 216. Seven examples of rules that may be included in ruleset 216 are described as follows for purposes of illustration. Each rule is described below with an exemplary rule name, an abstract, and a description of the function/mechanics of the rule:

(A) Rule Name: OrderBy Minimizer

Abstract: Used to eliminate unnecessary OrderBy operations.

Rule Mechanics: The OrderBy Minimizer steps through a list of OrderBy operators found in the program code, and finds any of the OrderBy operators whose result is not used in the program code (where "used" means the ordering performed by the OrderBy operator is not relied upon—is not output or required by a subsequent expression or method). For such a found OrderBy operator, the OrderBy Minimizer deletes the OrderBy operator as redundant from the program code, and rewrites any other lines of the program code affected by deletion of the code line statement (e.g., replacing variable names, etc.)

(B) Rule Name: ToCurrent Collection

Abstract: Used in the case of a complicated query that performs the following "ToCurrent" type of operators multiple times in succession—"ToList", 'ToDictionary', etc. Each of these ToCurrent operators are costly, and in a sequence of them, they are redundant except for the last operator in the sequence.

Rule Mechanics: The following pattern is detected—two or more of such operators in an aggregated set of query components (e.g., the single query expression containing multiple query components that was generated in step 804 of flowchart 800). All of the ToCurrent type operators are discarded from the aggregated set of query components except for the one (without changing the logic).

(C) Rule Name: DataRetrival Minimizer—Type 1

Abstract: Used when a large quantity of data requested by a query operator is not ultimately used, and thus the data retrieval can safely by reduced or not performed at all.

Rule Mechanics: The following pattern is detected—a query operator retrieves data, the retrieved data is sorted, and just the first or last element of the sorted data is used. Replace this query by a query which just performs the minimum value element or maximum value element retrieval, respectively, from the data (D) Rule Name: DataRetrival Minimizer—Type 2

Abstract: Used when a large quantity of data requested by a query operator is not ultimately used, and thus the data retrieval can safely by reduced or not performed at all.

Rule Mechanics: The following pattern is detected—a query operator retrieves data, and just the first or last element of the data is used. Replace this query by a query which just retrieves any random data element from the data.

(E) Rule Name: DataRetrival Minimizer—Type 3

Abstract: Used when a single very large data entity is retrieved but just a portion of the data is ultimately used.

Rule Mechanics: The following pattern is detected—data is requested that has the potential of being a large dataset (e.g., XML data, JSON data, a whole file, etc.), while just a subset of the retrieved data is to be used. Replace this query by a query which just retrieves the subset of data.

Examples of the applicability of the "DataRetrival Minimizer—Type 3" rule include:

(1) Requesting retrieval of a file, but ultimately only using the metadata of the file to determine how large the file is (rather than using the contents of the file). This rule can be used to avoid using a query operator to retrieve the entire file, but instead use a query operator to retrieve the file metadata (which may be several factors smaller in size than the entire file).

(2) Requesting a single database line or entity, and ultimately only using a single column of that line/entity. The entire DB line/entity might be very large. This rule can be used to replace the query operator with another query operator that retrieves only the desired column.

(F) Rule Name: Enumeration Iteration Minimizer

Abstract: Used when a query is utilizing a single value, and therefore there is no need to build the entire data structure in memory.

Rule Mechanics: The following pattern is detected—only a single value is used after a "ToCurrent" type operator. Switch the first with the later.

(G) Rule Name: Reversing Enumeration when Using Last( ) Operator

Abstract: Used in cases where just the last item is needed, and therefore enumerating from start to end is inefficient. By enumerating in reverse order we increase performance.

Rule Mechanics: The following pattern is detected—only the last value is used after a "ToCurrent" type operator. Replace the enumeration with its "reverse" matching operator and/or reverse the enumeration range values, and replace the operator "Last" with the operator "First".

As a further illustration, example rules are applied against the single query expression generated above, which is repeated below for ease of description:
var lastItem=Enumerable.Range(2, 1000).Where(IsPrime). ToList( ).ToDictionary(x=>x,x=>Math.Pow(x, pow)). Last( );

As described above, lazy evaluation was extended (step 304 of flowchart 300; laziness extender 404) to generate this functionally-equivalent aggregated set of query components. Furthermore, the efficiency of this single query expression may be further improved by applying rules of ruleset 216 (step 306 of flowchart 300; equivalent query set generator 406).

For instance, the ToCurrent Collection Minimizer rule (rule (B) above) may applied. In such case, context determiner 1104 detects the ToList and ToDictionary operators in the above query statement, which establish a common logical context. Rule selector 1106 applies the ToCurrent collection minimizer rule, which is associated with this common logical context in ruleset 216. The ToCurrent collection minimizer rule removes all ToCurrent operators from the query statement except for the last one, to generate the following more efficient, but functionally-equivalent query expression:
var lastItem=Enumerable.Range(2, 1000).Where(IsPrime). ToDictionary(x=>x, x=>Math.Pow(x, pow)).Last( );

Furthermore, the Enumeration Iteration Minimizer rule (rule (F) above) may be used that repositions a Last( )/ First( ) operator to be located before a ToCurrent statement (in this case ToDictionary). In this manner, the query statement iterates until the first item is found, and therefore all the data structure is not filled. Instead, the ToDictionary operator will operate on a single entity. Accordingly, context determiner 1104 determines the ToDictionary operator followed by a Last operator in the above query statement to establish a common logical context. Rule selector 1106 applies the Enumerable iteration rule, which is associated with this common logical context. The Enumerable iteration rule repositions the Last operator before the ToDictionary operator, to generate the following more efficient, but functionally-equivalent query expression:
var lastItem=Enumerable.Range(2, 1000).Where(IsPrime). Last( ).ToDictionary(x=>x, x=>Math.Pow(x, pow))

Still further, the Reversing Enumeration When Using Last( ) Operator (rule (G) above) may be used that reverses an order of search for a last item. This is because it is much more efficient to go in reverse order when looking for the last item. Thus, this rule enumerates numbers in reverse order and take the first element rather than the last. Accordingly, context determiner 1104 determines the Last operator preceding the ToDictionary operator in the above query statement to establish a common logical context. Rule selector 1106 applies the Optimizing the Enumerable rule, which is associated with this common logical context. The Optimizing the Enumerable rule replaces the Last operator with a First operator, to generate the following more efficient, but functionally-equivalent query expression:
var lastItem=Enumerable.Range(1000, 2).Where(IsPrime). First( ).ToDictionary(x=>x, x=>Math.Pow(x, pow))

This final query iterates over the integers starting from 1100 downwards, finding the first prime therein, and performing this much more efficiently (e.g., using less memory to store data, and better using the CPU) than the original, three-method version shown further above.

Note that in an embodiment, equivalent query set generator 406 may sequentially apply rules of ruleset 216 until no more rules can be applied to determine a single functionally equivalent query set. In another embodiment, multiple different sets of functionally equivalent query sets may be determined by equivalent query set generator 406, with each determined set being applicable to replace the detected queries in program code 106. In such an embodiment, rule selector 1106 may enable the developer to manually select one of the functionally equivalent query sets to apply to program code 106 to generate refactored program code 108. Alternatively, rule selector 1106 may make the selection automatically.

Figure 12:
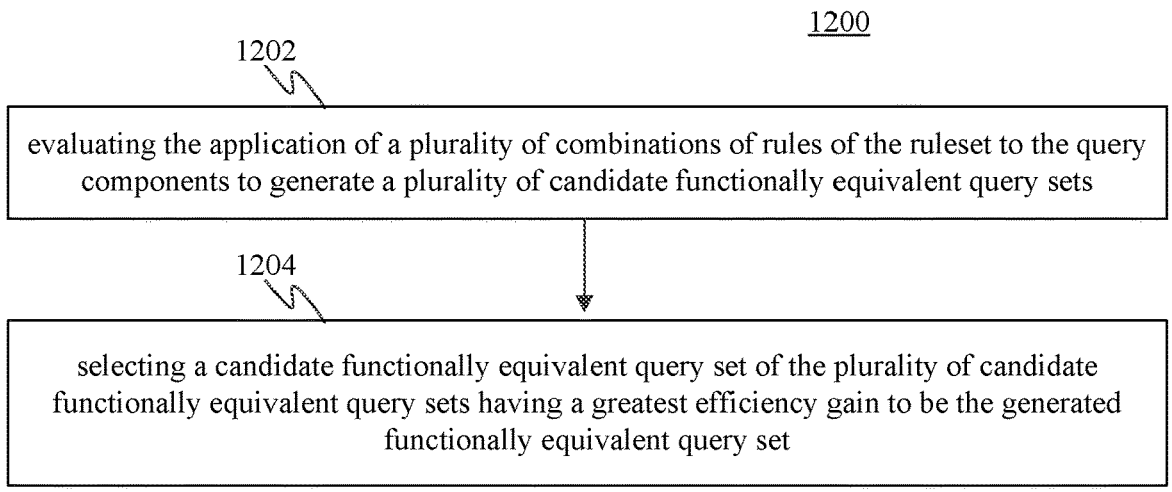
FIG. 12 shows a flowchart providing a process for generating and selecting between a plurality of candidate functionally equivalent query sets, according to an example embodiment.

For instance, FIG. 12 shows a flowchart 1200 providing a process for generating and selecting between a plurality of candidate functionally equivalent query sets, according to an example embodiment. In an embodiment, rule selector 1106 may perform flowchart 1200. Flowchart 1200 is described as follows.

In step 1202, the application of a plurality of combinations of rules of the ruleset to the query components is evaluated to generate a plurality of candidate functionally equivalent query sets. In an embodiment, rule selector 1106 may apply different combinations and/or orders of rules to program code to generate different functionally equivalent query sets. For example, a particular program code may include OrderBy, GroupBy, and ThenBy query components in a query expression. Rule selector 1106 may apply a first rule to the query expression that replaces the OrderBy and GroupBy with a first query operator to generate a first functionally equivalent query set, and then may alternatively then apply a second rule to the query expression that replaces the GroupBy and ThenBy with a second query operator to generate a second functionally equivalent query sets. In this manner, two functionally equivalent query sets are generated for a same query expression, which may each have their own efficiency characteristics. Any number of functionally equivalent query sets may be generated for a same query expression, depending on the particular query operators in the query expression, and the rules available in ruleset 216.

In step 1204, a candidate functionally equivalent query set of the plurality of candidate functionally equivalent query sets having a greatest efficiency gain is selected to be the generated functionally equivalent query set. In the above example, rule selector 1106 may enable the developer to select which of the first and second functionally equivalent query sets to refactor into the program code, or may automatically select which of the first and second query components to refactor into the program code. For example, rule selector 1106 may select the one of the available functionally equivalent query sets having a greatest efficiency. This greatest efficiency may be determined in various ways.

For instance, each rule in ruleset 216 may have a corresponding efficiency value (e.g., a number from 0-1) that indicates a relative efficiency for the rule. Rule selector 1106 may combine the efficiency values for each of the rules used for a particular functionally equivalent query set to determine an overall efficiency value of that functionally equivalent query set, and then may compare the overall efficiency values for all functionally equivalent query sets to determine which has the greatest efficiency. In other embodiments, rule selector 1106 may determine a greatest efficiency in other ways.

Note that in an embodiment, flowchart 1200 may be performed at compile time or at runtime. For instance, at runtime, an executable version of program code 106 or refactored program code 108 (e.g., machine code 222) may be executed by an execution engine (e.g., in an operating system, etc.). According to a runtime embodiment, the best candidate functionally equivalent query set may be determined in a manner that takes into account the actual system health state. This is because the efficiency gain provided by one or more of the candidate functionally equivalent query sets may be at least partially dependent on execution conditions at runtime. For instance, at runtime, the executable version of program code may execute, and when a particular query is to be executed, a call may be made by the program code to rule selector 1106 (which may be implemented by the execution engine, for instance), to select which candidate functionally equivalent query set to implement based runtime conditions (e.g., network conditions, available processing bandwidth, available processing power, etc.).

For example, in normal runtime conditions (e.g., full network availability, etc.), candidate functionally equivalent query set A may be more efficient than functionally equivalent query set B. However, during a particular runtime, something undesired may interfere with the performance of the query components of functionally equivalent query set A, such as a slow Internet connection, etc. Accordingly, in such a runtime condition (e.g., poor network response), functionally equivalent query set B may enable more efficiency, and thus may be selected by rule selector 1106 to be executed during that particular runtime (rather than query set A). Accordingly, in embodiments, rule selector 1106 may be configured to enable selection of a candidate functionally equivalent query set at runtime.

It is noted the rules may be added to ruleset 216 in any manner, including manually or automatically. For example, a developer may add a rule to ruleset 216 based on the experience of the developer, including a desire to fix a particular efficiency problem with queries that developer as seen or been made aware of. In another embodiment, an automatic mechanism may generate new rules, including an automatic mechanism that incorporates machine learning. Machine learning may be used to sample equivalent queries during runtime for relative efficiency, and based thereon, automatically select the most efficient query for that scenario. For each query optimization provided by a rule, query optimizer 104 may maintain a detailed analysis of the impact made by the query optimization.

III. Example Mobile and Stationary Device Embodiments

Computing device 102, query optimizer 104, compiler 204, development application 200, source code editor 202, compiler 204, debugger tool 206, query detector 402, laziness extender 404, equivalent query set generator 406, extendable query detector 902, query expression assembler 904, content determiner 1104, rule selector 1106, flowchart 300, flowchart 500, flowchart 700, flowchart 800, flowchart 1000, and flowchart 1200 may be implemented in hardware, or hardware combined with software and/or firmware. For example, query optimizer 104, compiler 204, development application 200, source code editor 202, compiler 204, debugger tool 206, query detector 402, laziness extender 404, equivalent query set generator 406, extendable query detector 902, query expression assembler 904, content determiner 1104, rule selector 1106, flowchart 300, flowchart 500, flowchart 700, flowchart 800, flowchart 1000, and/or flowchart 1200 may be implemented as computer program code/instructions configured to be executed in one or more processors and stored in a computer readable storage medium. Alternatively, computing device 102, query optimizer 104, compiler 204, development application 200, source code editor 202, compiler 204, debugger tool 206, query detector 402, laziness extender 404, equivalent query set generator 406, extendable query detector 902, query expression assembler 904, content determiner 1104, rule selector 1106, flowchart 300, flowchart 500, flowchart 700, flowchart 800, flowchart 1000, and/or flowchart 1200 may be implemented as hardware logic/electrical circuitry.

For instance, in an embodiment, one or more, in any combination, of query optimizer 104, compiler 204, development application 200, source code editor 202, compiler 204, debugger tool 206, query detector 402, laziness extender 404, equivalent query set generator 406, extendable query detector 902, query expression assembler 904, content determiner 1104, rule selector 1106, flowchart 300, flowchart 500, flowchart 700, flowchart 800, flowchart 1000, and/or flowchart 1200 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 13:
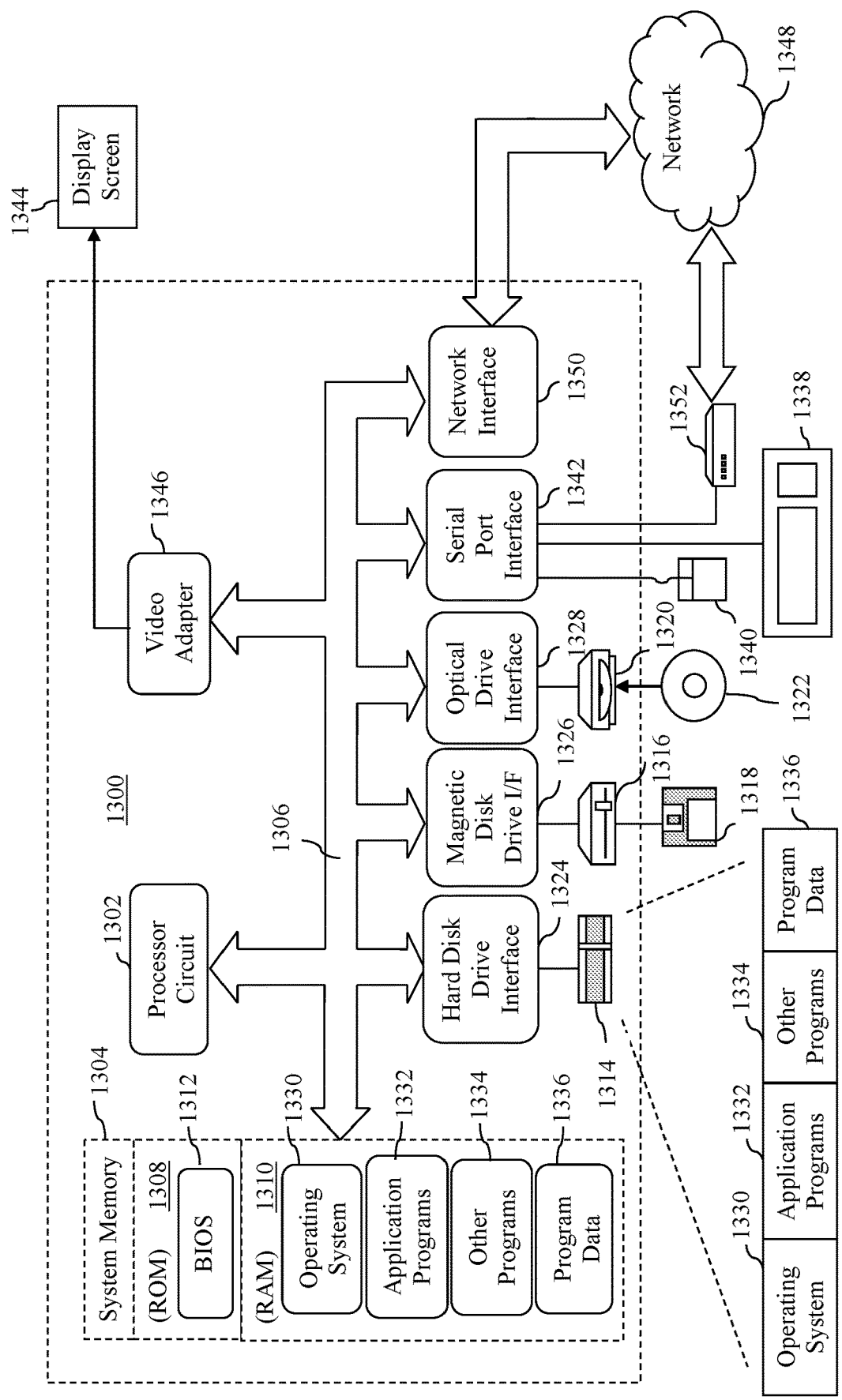
FIG. 13 shows a block diagram of an example computing device that may be used to implement embodiments.

FIG. 13 depicts an exemplary implementation of a computing device 1300 in which embodiments may be implemented. For example, computing device 102 and/or client computing device 104 may be implemented in one or more computing devices similar to computing device 1300 in stationary or mobile computer embodiments, including one or more features of computing device 1300 and/or alternative features. The description of computing device 1300 provided herein is provided for purposes of illustration, and is not intended to be limiting. Embodiments may be implemented in further types of computer systems, as would be known to persons skilled in the relevant art(s).

As shown in FIG. 13, computing device 1300 includes one or more processors, referred to as processor circuit 1302, a system memory 1304, and a bus 1306 that couples various system components including system memory 1304 to processor circuit 1302. Processor circuit 1302 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1302 may execute program code stored in a computer readable medium, such as program code of operating system 1330, application programs 1332, other programs 1334, etc. Bus 1306 represents one or more of any of several types of bus structures, including a memory bus or memory controller, a peripheral bus, an accelerated graphics port, and a processor or local bus using any of a variety of bus architectures. System memory 1304 includes read only memory (ROM) 1308 and random access memory (RAM) 1310. A basic input/output system 1312 (BIOS) is stored in ROM 1308.

Computing device 1300 also has one or more of the following drives: a hard disk drive 1314 for reading from and writing to a hard disk, a magnetic disk drive 1316 for reading from or writing to a removable magnetic disk 1318, and an optical disk drive 1320 for reading from or writing to a removable optical disk 1322 such as a CD ROM, DVD ROM, or other optical media. Hard disk drive 1314, magnetic disk drive 1316, and optical disk drive 1320 are connected to bus 1306 by a hard disk drive interface 1324, a magnetic disk drive interface 1326, and an optical drive interface 1328, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1330, one or more application programs 1332, other programs 1334, and program data 1336. Application programs 1332 or other programs 1334 may include, for example, computer program logic (e.g., computer program code or instructions) for implementing query optimizer 104, compiler 204, development application 200, source code editor 202, compiler 204, debugger tool 206, query detector 402, laziness extender 404, equivalent query set generator 406, extendable query detector 902, query expression assembler 904, content determiner 1104, rule selector 1106, flowchart 300, flowchart 500, flowchart 700, flowchart 800, flowchart 1000, and/or flowchart 1200 (including any suitable step of flowcharts 300, 500, 700, 800, 1000, 1200), and/or further embodiments described herein.

A user may enter commands and information into the computing device 1300 through input devices such as keyboard 1338 and pointing device 1340. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1302 through a serial port interface 1342 that is coupled to bus 1306, but may be connected by other interfaces, such as a parallel port, game port, or a universal serial bus (USB).

A display screen 1344 is also connected to bus 1306 via an interface, such as a video adapter 1346. Display screen 1344 may be external to, or incorporated in computing device 1300. Display screen 1344 may display information, as well as being a user interface for receiving user commands and/or other information (e.g., by touch, finger gestures, virtual keyboard, etc.). In addition to display screen 1344, computing device 1300 may include other peripheral output devices (not shown) such as speakers and printers.

Computing device 1300 is connected to a network 1348 (e.g., the Internet) through an adaptor or network interface 1350, a modem 1352, or other means for establishing communications over the network. Modem 1352, which may be internal or external, may be connected to bus 1306 via serial port interface 1342, as shown in FIG. 13, or may be connected to bus 1306 using another interface type, including a parallel interface.

As used herein, the terms "computer program medium," "computer-readable medium," and "computer-readable storage medium" are used to refer to physical hardware media such as the hard disk associated with hard disk drive 1314, removable magnetic disk 1318, removable optical disk 1322, other physical hardware media such as RAMs, ROMs, flash memory cards, digital video disks, zip disks, MEMs, nanotechnology-based storage devices, and further types of physical/tangible hardware storage media (including memory 1320 of FIG. 13). Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1332 and other programs 1334) may be stored on the hard disk, magnetic disk, optical disk, ROM, RAM, or other hardware storage medium. Such computer programs may also be received via network interface 1350, serial port interface 1342, or any other interface type. Such computer programs, when executed or loaded by an application, enable computing device 1300 to implement features of embodiments discussed herein. Accordingly, such computer programs represent controllers of the computing device 1300.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Example Embodiments

In an embodiment, a method comprises: detecting a plurality of queries in program code; extending laziness by which the queries are evaluated in the program code; and applying a ruleset that includes a plurality of rules to the detected queries to generate a functionally equivalent query set that evaluates more efficiently relative to the detected queries.

In an embodiment, the detecting comprises: detecting the queries in the program code in a code editor; and the method further comprising: presenting an option for the code editor to automatically refactor the program code to replace the plurality of queries with the functionally equivalent query set.

In an embodiment, the detecting comprises: detecting the queries in the program code during compilation; and the method further comprising: generating compiled code in the compiler based on a version of the program code where the plurality of queries is replaced with the functionally equivalent query set.

In an embodiment, the extending laziness by which the queries are evaluated in the program code comprises: detecting one or more of the queries that are evaluation-extendable; and forming a single query expression that includes the one or more evaluation-extendable queries.

In an embodiment, the applying a ruleset comprises: determining a common logical context between multiple query components; and applying a rule of the ruleset corresponding to the common logical context to the multiple query components.

In an embodiment, the generated functionally equivalent query set evaluates more efficiently relative to the plurality of queries by at least one of generating query results consuming less memory space than query results of the plurality of queries, taking less time to execute than the plurality of queries, consuming less network bandwidth than the plurality of queries, or, consuming less processing power than the plurality of queries.

In an embodiment, the applying a ruleset comprises: evaluating the application of a plurality of combinations of rules of the ruleset to the query components to generate a plurality of candidate functionally equivalent query sets; and selecting a candidate functionally equivalent query set of the plurality of candidate functionally equivalent query sets having a greatest efficiency gain to be the generated functionally equivalent query set.

In an embodiment, the applying a ruleset comprises: evaluating during runtime the application of a plurality of combinations of rules of the ruleset to the query components to generate a plurality of candidate functionally equivalent query sets; and selecting during runtime a candidate functionally equivalent query set of the plurality of candidate functionally equivalent query sets having a greatest efficiency gain to be the generated functionally equivalent query set.

In an embodiment, the efficiency gain provided by one or more of the candidate functionally equivalent query sets is at least partially dependent on execution conditions at runtime.

In an embodiment, the method further comprises: using machine learning to generate at least one rule to add to the ruleset.

In another embodiment, a computing device comprises: at least one processor circuit; and at least one memory that stores program code configured to be executed by the at least one processor circuit, the program code configured to perform operations comprising: detecting a plurality of queries in program code; extending laziness by which the queries are evaluated in the program code; and applying a ruleset that includes a plurality of rules to the detected queries to generate a functionally equivalent query set that evaluates more efficiently relative to the detected queries.

In an embodiment, the detecting comprises: detecting the queries in the program code in a code editor; and the method further comprising: presenting an option for the code editor to automatically refactor the program code to replace the plurality of queries with the functionally equivalent query set.

In an embodiment, the detecting comprises: detecting the queries in the program code during compilation; and the method further comprising: generating compiled code in the compiler based on a version of the program code where the plurality of queries is replaced with the functionally equivalent query set.

In an embodiment, the extending laziness by which the queries are evaluated in the program code comprises: detecting one or more of the queries that are evaluation-extendable; and forming a single query expression that includes the one or more evaluation-extendable queries.

In an embodiment, the applying a ruleset comprises: determining a common logical context between multiple query components; and applying a rule of the ruleset corresponding to the common logical context to the multiple query components.

In an embodiment, the applying a ruleset comprises: evaluating the application of a plurality of combinations of rules of the ruleset to the query components to generate a plurality of candidate functionally equivalent query sets; and selecting a candidate functionally equivalent query set of the plurality of candidate functionally equivalent query sets having a greatest efficiency gain to be the generated functionally equivalent query set.

In an embodiment, the applying a ruleset comprises: evaluating during runtime the application of a plurality of combinations of rules of the ruleset to the query components to generate a plurality of candidate functionally equivalent query sets; and selecting during runtime a candidate functionally equivalent query set of the plurality of candidate functionally equivalent query sets having a greatest efficiency gain to be the generated functionally equivalent query set.

In an embodiment, the efficiency gain provided by one or more of the candidate functionally equivalent query sets is at least partially dependent on execution conditions at runtime.

In an embodiment, the operations further comprise: using machine learning to generate at least one rule to add to the ruleset.

In another embodiment, a computing device comprises: at least one processor circuit; and at least one memory that stores program code configured to be executed by the at least one processor circuit, the program code comprising: a query detector configured to detect a plurality of queries in program code; a laziness extender configured to extend laziness by which the queries are evaluated in the program code; and an equivalent query set generator configured to apply a ruleset that includes a plurality of rules to the detected queries to generate a functionally equivalent query set that evaluates more efficiently relative to the detected queries.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method performed by a computing device, comprising:
   detecting a plurality of queries in program code;
   extending laziness by which the queries are evaluated in the program code;

determining, during runtime of the program code, runtime conditions of the computing device on which the plurality of queries is to execute;

determining that the queries for which laziness has been extended are configured to retrieve a dataset, sort the dataset, and utilize at least one of a first element of the dataset or a last element of the dataset that has been sorted; and generating, during runtime of the program code, a functionally equivalent query set that evaluates more efficiently with respect to the determined runtime conditions relative to the queries for which laziness has been extended based on a rule that minimizes retrieval of the dataset, the rule included in a ruleset, the ruleset determining the functionally equivalent query set in response to said determining that the queries for which laziness has been extended are configured to retrieve the data set, sort the dataset, and utilizes the at least one of the first element of the dataset or the last element of the dataset that has been sorted, the functionally equivalent query set configured to retrieve the at least one of the first element of the dataset or the last element of the dataset in lieu of retrieving the entirety of the dataset and sorting the dataset.

2. The method of claim 1, wherein said extending laziness by which the queries are evaluated in the program code comprises:

detecting one or more of the queries that are evaluation-extendable; and forming a single query expression that includes the one or more evaluation-extendable queries.

3. The method of claim 1, wherein said generating comprises:

determining a common logical context between multiple query components; and applying a second rule of the ruleset corresponding to the common logical context to the multiple query components.

4. The method of claim 1, wherein the generated functionally equivalent query set evaluates more efficiently relative to the plurality of queries by at least one of generating query results consuming less memory space than query results of the plurality of queries, taking less time to execute than the plurality of queries, consuming less network bandwidth than the plurality of queries, or, consuming less processing power than the plurality of queries.

5. The method of claim 1, wherein said applying a ruleset comprises:

evaluating the application of a plurality of combinations of rules of the ruleset to the query components to generate a plurality of candidate functionally equivalent query sets; and selecting a candidate functionally equivalent query set of the plurality of candidate functionally equivalent query sets having a greatest efficiency gain to be the generated functionally equivalent query set.

6. The method of claim 1, wherein said applying a ruleset comprises:

evaluating during runtime the application of a plurality of combinations of rules of the ruleset to the query components to generate a plurality of candidate functionally equivalent query sets; and selecting during runtime a candidate functionally equivalent query set of the plurality of candidate functionally equivalent query sets having a greatest efficiency gain to be the generated functionally equivalent query set.

7. The method of claim 6, wherein the efficiency gain provided by one or more of the candidate functionally equivalent query sets is at least partially dependent on execution conditions at runtime.

8. The method of claim 1, further comprising:

using machine learning to generate at least one rule to add to the ruleset.

9. A computing device, comprising:

at least one processor circuit; and at least one memory that stores program code configured to be executed by the at least one processor circuit, the program code configured to perform operations comprising:

detecting a plurality of queries in program code;

extending laziness by which the queries are evaluated in the program code;

determining, during runtime of the program code, runtime conditions of the computing device on which the plurality of queries is to execute;

determining that the queries for which laziness has been extended are configured to retrieve a dataset, sort the dataset, and utilize at least one of a first element of the dataset or a last element of the dataset that has been sorted; and generating, during runtime of the program code, a functionally equivalent query set that evaluates more efficiently with respect to the determined runtime conditions relative to the queries for which laziness has been extended based on a rule that minimizes retrieval of the dataset, the rule included in a ruleset, the ruleset determining the functionally equivalent query set in response to said determining that the queries for which laziness has been extended are configured to retrieve the data set, sort the dataset, and utilizes the at least one of the first element of the dataset or the last element of the dataset that has been sorted, the functionally equivalent query set configured to retrieve the at least one of the first element of the dataset or the last element of the dataset in lieu of retrieving the entirety of the dataset and sorting the dataset.

10. The computing device of claim 9, wherein said extending laziness by which the queries are evaluated in the program code comprises:

detecting one or more of the queries that are evaluation-extendable; and forming a single query expression that includes the one or more evaluation-extendable queries.

11. The computing device of claim 9, wherein said generating comprises:

determining a common logical context between multiple query components; and applying a second rule of the ruleset corresponding to the common logical context to the multiple query components.

12. The computing device of claim 9, wherein said generating comprises:

evaluating the application of a plurality of combinations of rules of the ruleset to the query components to generate a plurality of candidate functionally equivalent query sets; and selecting a candidate functionally equivalent query set of the plurality of candidate functionally equivalent query sets having a greatest efficiency gain to be the generated functionally equivalent query set.

13. The computing device of claim 9, wherein said generating comprises:
  evaluating during runtime the application of a plurality of combinations of rules of the ruleset to the query components to generate a plurality of candidate functionally equivalent query sets; and
  selecting during runtime a candidate functionally equivalent query set of the plurality of candidate functionally equivalent query sets having a greatest efficiency gain to be the generated functionally equivalent query set.

14. The computing device of claim 13, wherein the efficiency gain provided by one or more of the candidate functionally equivalent query sets is at least partially dependent on execution conditions at runtime.

15. The computing device of claim 9, wherein the operations further comprise:
  using machine learning to generate at least one rule to add to the ruleset.

16. A computing device, comprising:
  at least one processor circuit; and
  at least one memory that stores program code configured to be executed by the at least one processor circuit, the program code comprising:
    a query detector configured to detect a plurality of queries in program code;
    a laziness extender configured to extend laziness by which the queries are evaluated in the program code;
    an equivalent query set generator configured to:
      determine, during runtime of the program code, runtime conditions of the computing device on which the plurality of queries is to execute;
      determine that the queries for which laziness has been extended are configured to retrieve a dataset, sort the dataset, and utilize at least one of a first element of the dataset or a last element of the dataset that has been sorted; and
      generating, during runtime of the program code, a functionally equivalent query set that evaluates more efficiently with respect to the determined runtime conditions relative to the queries for which laziness has been extended based on a rule that minimizes retrieval of the dataset, the rule included in a ruleset, the ruleset determining the functionally equivalent query set in response to said determining that the queries for which laziness has been extended are configured to retrieve the data set, sort the dataset, and utilizes the at least one of the first element of the dataset or the last element of the dataset that has been sorted,
      the functionally equivalent query set configured to retrieve the at least one of the first element of the dataset or the last element of the dataset in lieu of retrieving the entirety of the dataset and sorting the dataset.

17. The computing device of claim 16, wherein the laziness extender is configured to extend laziness by:
  detecting one or more of the queries that are evaluation-extendable; and
  forming a single query expression that includes the one or more evaluation-extendable queries.

18. The computing device of claim 16, wherein the equivalent query set generator is configured to generate the functionally equivalent query set by:
  determining a common logical context between multiple query components; and
  applying a second rule of the ruleset corresponding to the common logical context to the multiple query components.

19. The computing device of claim 16, wherein the equivalent query set generator is configured to generate the functionally equivalent query set by:
  evaluating during runtime the application of a plurality of combinations of rules of the ruleset to the query components to generate a plurality of candidate functionally equivalent query sets; and
  selecting during runtime a candidate functionally equivalent query set of the plurality of candidate functionally equivalent query sets having a greatest efficiency gain to be the generated functionally equivalent query set.

20. The computing device of claim 19, wherein the efficiency gain provided by one or more of the candidate functionally equivalent query sets is at least partially dependent on execution conditions at runtime.

* * * * *